US009419708B2

(12) United States Patent
Rad et al.

(10) Patent No.: US 9,419,708 B2
(45) Date of Patent: Aug. 16, 2016

(54) LIVE MONITORING OF RAMAN AND FIBER DEGRADATION IN DWDM NETWORKS USING IN-SERVICE OTDR

(71) Applicant: Ciena Corporation, Hanover, MD (US)

(72) Inventors: Mohammad Mehdi Mansouri Rad, Ottawa (CA); David C. Bownass, Ottawa (CA); Loren S. Berg, Richmond (CA); David W. Boertjes, Nepean (CA); Jean-Luc Archambault, Ottawa (CA)

(73) Assignee: Ciena Corporation, Hanover, MD (US)

( * ) Notice: Subject to any disclaimer, the term of this patent is extended or adjusted under 35 U.S.C. 154(b) by 1 day.

(21) Appl. No.: 14/476,882

(22) Filed: Sep. 4, 2014

(65) Prior Publication Data

US 2016/0072576 A1    Mar. 10, 2016

(51) Int. Cl.
*G01N 21/55* (2014.01)
*H04B 10/071* (2013.01)
*G01M 11/00* (2006.01)
*H04B 10/25* (2013.01)
*H04J 14/02* (2006.01)

(52) U.S. Cl.
CPC ............. *H04B 10/071* (2013.01); *G01M 11/31* (2013.01); *G01M 11/3109* (2013.01); *G01M 11/3145* (2013.01); *H04B 10/25* (2013.01); *H04J 14/02* (2013.01)

(58) Field of Classification Search
CPC ... G01N 21/553; G01N 21/55; G01N 21/554; G01N 21/474; G01N 21/57

USPC .......................................................... 356/445
See application file for complete search history.

(56) References Cited

U.S. PATENT DOCUMENTS

| 7,872,738 B2* | 1/2011 | Abbott | H04B 10/071 356/73.1 |
|---|---|---|---|
| 2004/0150875 A1* | 8/2004 | Fishman | H04B 10/2916 359/341.41 |
| 2006/0024063 A1* | 2/2006 | Onaka | H04B 10/2941 398/149 |
| 2007/0025676 A1* | 2/2007 | Russell | G01M 11/3136 385/134 |
| 2009/0207482 A1* | 8/2009 | Izumi | H04B 10/2916 359/334 |
| 2014/0072306 A1* | 3/2014 | Sridhar | H04J 14/0275 398/79 |
| 2014/0077971 A1* | 3/2014 | Archambault | H04Q 9/00 340/870.04 |

* cited by examiner

*Primary Examiner* — Tarifur Chowdhury
*Assistant Examiner* — Md M Rahman
(74) *Attorney, Agent, or Firm* — Clements Bernard PLLC; Christopher L. Bernard; Lawrence A. Baratta, Jr.

(57) ABSTRACT

A method of analysing performance of an optical fiber link. As a preliminary step, a reference trace indicative of a distributed optical performance of the optical fiber link is derived. During in-service operation of the optical fiber link, an Optical Time Domain Reflectometry (OTDR) sub-system measures an OTDR trace with Raman amplification ON, and a real-time cumulative Raman Gain profile of the optical fiber link is calculated based on the reference trace and the measured OTDR trace.

19 Claims, 7 Drawing Sheets ations, and in particular to techniques for live monitoring of Raman and fiber degradation in Dense Wavelength Division Multiplexing (DWDM) networks using in-service Optical Time Domain Reflectometry (OTDR).

LIVE MONITORING OF RAMAN AND FIBER DEGRADATION IN DWDM NETWORKS USING IN-SERVICE OTDR

CROSS REFERENCE TO RELATED APPLICATIONS

This is the first application filed in respect of the present invention.

TECHNICAL FIELD

The present invention relates generally to fibre-optic communication systems, and in particular to techniques for live monitoring of Raman and fiber degradation in Dense Wavelength Division Multiplexing (DWDM) networks using in-service Optical Time Domain Reflectometry (OTDR).

BACKGROUND

For the purposes of the present disclosure, the term "in-service" shall be understood to refer to an optical link in which at least one channel is carrying (or is available to carry) data traffic. Similarly, "in-service OTDR", and "in-service Raman" and the like shall be understood to refer to OTDR measurements and Raman amplification operation pertaining to an "in-service" optical fiber link.

FIGS. 1A-1D illustrate representative Wavelength Division Multiplexed (WDM) or Dense Wavelength Division Multiplexed (DWDM) optical systems 2 known in the art. In all four examples, the system 2 comprises an optical fiber link 3 having a known length which extends between a set of transmitters 6 at a transmitting end of the system 2, and a corresponding set of receivers 8 at a receiving end of the system. Typically, the optical link 3 will include two or more optical fiber spans 4, interconnected by discrete optical devices 5 such as, for example, Erbium Doped Fiber Amplifiers EDFAs and optical switches. In the illustrated arrangement, optical MUX and DEMUX devices, 10, 12 are provided to combine optical channel signals from each transmitter into a WDM signal for transmission through the optical fiber span, and for supplying each wavelength channel from the WDM signal to a respective receiver. However, it will be appreciated that other suitable MUX/DEMUX arrangements may be used if desired. For the purposes of the present invention, each fiber span 4 can be any suitable type and length; each transmitter may be tuned to any suitable wavelength channel and may use any suitable modulation technique to transmit data through the fiber span; and each receiver may use any suitable detection (i.e. direct or coherent detection) and decoding techniques.

Optical Time Domain Reflectometry (OTDR) is a well-known technique which can be used to obtain an impulse response of an optical fiber span 4, and extract useful information regarding optical properties of the fiber link 3. For example, OTDR has been successfully used to obtain information about fiber attenuation profile (i.e. loss vs. distance), and point losses and/or reflections due to physical problems with the fiber (such as a "pinched" fiber). Degradation or impairment of fiber properties over time may be monitored by saving a reference OTDR measurement, and comparing it with a new OTDR measurement made at a later time.

In the examples of FIGS. 1A-1D, OTDR is implemented by means of an OTDR subsystem 14 connected to the optical fiber link 3 at a suitable location. In the illustrated examples, only one OTDR subsystem 14 is shown. However, in practice, any suitable number of OTDR subsystems 14 may be employed, and these may be connected to the optical fiber link 3 at any suitable location(s). In the examples of FIGS. 1A and 1B, the OTDR sub-system 14 is connected to the fiber link 3 such that OTDR pulses are launched into the fiber span 4 and propagate in the same direction as traffic launched from a transmitter 6. This is referred to as co-propagating OTDR. In the examples of FIGS. 1C and 1D, the OTDR sub-system 14 is connected to the fiber link 3 such that OTDR pulses are launched into the fiber span 4 and propagate in the opposite direction as traffic launched from a transmitter 6. This is referred to as counter-propagating OTDR.

An advantage of OTDR is that it permits measurement of the optical characteristics of an optical fiber link installed in a network. Typically, OTDR is used to evaluate the performance of unused (i.e. "dark") fibers, which have been installed, in the network but which are not carrying any optical channel signals. This provides an effective means of determining whether or not an installed optical fiber link is ready to support optical channel traffic when needed. However, in some cases it is also possible to perform OTDR measurements of "in-service" fibers by selecting a wavelength for the OTDR measurements that will not interfere with optical channel signals within the fiber.

Meanwhile, the increasing demand for bandwidth and signal reach is driving the development of technologies capable of transmitting more and more bits per second in the DWDM (dense wavelength division multiplexing) spectrum. Supporting such demands requires better Optical Signal-to-Noise ratio (OSNR) for each traffic signal. A commonly used technique to improve OSNR is to deploy Raman amplifiers employing co- or counter propagating pump lasers. Raman amplifiers work by taking the advantage of nonlinear Stimulated Raman Scattering (SRS) phenomena in the fiber, and the interaction between Raman pump laser light and the optical channel signals propagating in the fiber.

Typically, Raman amplification is implemented by means of a Raman module 16 or card, that includes a pump laser 18 and a coupler 20 for optically coupling pump light from the pump laser 18 into an optical fiber span 4 at a desired location. As the pump light propagates through the link 3, energy is coupled from the pump light into any optical signals having a wavelength lying within a Raman gain region, thereby amplifying any such optical signals. In the examples of FIGS. 1A and 1D, the Raman module 16 is connected to the fiber link 3 such that the pump light propagate in the same direction as traffic launched from a transmitter 6. This is referred to as co-propagating Raman. In the examples of FIGS. 1B and 1C, the Raman module 16 is connected to the fiber link 3 such that the pump light propagates in the opposite direction as traffic launched from a transmitter 6. This is referred to as counter-propagating Raman.

In practical optical transmission systems, any suitable number of Raman modules 14 may be provided, and may be connected to the link 3 at any suitable location. For example, Raman modules may be provided at both the transmitter and receiver ends of the link 3. If desired, one or more Raman modules may be provided at a discrete optical device 5 so as to inject pump light into a desired fiber span 4. In systems having more than one Raman module 14, the respective Raman pump lasers 18 may be tuned to a common wavelength, or to respective different wavelengths, as desired. In some cases, a Raman module may include more than one pump laser 18, and these lasers may be tuned to the same, or different wavelengths, as desired.

In FIGS. 1A-1D, the length of a fiber span 4 (L) is measured from the point at which the OTDR sub-system 14 is connected to the fiber. Thus, in FIGS. 1A and 1B, the origin (z=0) is located at the transmitter end of a span 4, and distances are measured toward the receiver end of the link 3. Conversely, in FIGS. 1C and 1D, the origin (z=0) is located at the discrete optical device 5, and distances are measured toward the transmitter end of the link 3. This nomenclature is relevant to the present technique because OTDR measures distance from the point of injection of the OTDR pulses.

Because Raman amplification utilizes the fiber itself as the gain media, the optical characteristics of the installed fiber link must be well defined before turning the pump laser(s) on. This is very important both in terms of safety and performance, as pump laser power levels can be high enough to cause damage due to point losses such as poor splices or dirty connectors. Conventional OTDR methods can be used to accomplish the required characterization of the installed optical fiber link. Typically, a so-called "short trace" is used to characterise portions of a fiber link where Raman gain is expected to be high, which corresponds to the portion of the fiber nearest to the Raman module. If the short trace identifies a problem with the fiber, such as a high loss, the fiber link is disqualified and a service technician or management system may be notified. A long trace is typically used to detect faults along the entire length of the fiber link, and so may be used to locate a pinch or cut in the fiber span. The short and long OTDR traces are commonly used together to obtain a "snapshot" of the optical link characteristics.

However, when the Raman pump lasers are turned ON, OTDR traces are adversely affected by nonlinear Raman scattering from the pump light. Because the intensities of both the Raman scattering and the OTDR return signal are affected by the properties of the optical fiber, there is no reliable method of analysing OTDR trace information to distinguish degradations in Raman gain from degradations in fiber performance. As a result, the conventional use of OTDR for analysing optical fiber characteristics is limited to situations in which the Raman pump lasers are turned OFF, which implies that the transmitters 6 are not transmitting optical signal traffic through the fiber link 3.

As noted above, conventional OTDR trace information is obtained when Raman amplification is OFF, i.e., no Raman gain and therefore no traffic (which implies that the optical link 3 is out of service). The two conventional applications of OTDR comprise: short trace, to investigate if the fiber qualities for Raman amplification with regard to safety and performance concerns; and long trace, in fault scenarios such as fiber cut when an automatic fiber cut location analysis is performed. In both of these applications, OTDR trace information is obtained only when the optical link is out of-service.

Consequently, network elements typically use a telemetry channel to estimate the overall gain experienced by wavelength channels/signals when the link is in-service. This technique provides a blind estimation of the gain due to the presence of Raman pump light. As a result any degradation in provided Raman gain cannot be simply analyzed to be due to the real degradation in Raman gain or due to non-Raman related issues.

It would be desirable to provide techniques for analysing in-service fiber link characteristics using real-time OTDR trace information in the presence of Raman amplification. In this respect, "real-time" should be understood to refer to information that is obtained from measurements with minimum processing delay, so that the measurements and the information obtained therefrom, provide a high-fidelity representation of the current state and/or performance of the optical fiber link.

SUMMARY

Aspects of the present invention provide methods and systems to analyse fiber link performance using OTDR trace information in the presence of Raman amplification.

According to one aspect, the present invention provides a method of analysing performance of an optical fiber link. As a preliminary step, a reference trace indicative of a distributed optical performance of the optical fiber link is derived. During in-service operation of the optical fiber link, an Optical Time Domain Reflectometry (OTDR) sub-system measures an OTDR trace with Raman amplification ON, and a real-time cumulative Raman Gain profile of the optical fiber link is calculated based on the reference trace and the measured OTDR trace.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Representative embodiments of the invention will now be described by way of example only with reference to the accompanying drawings, in which.

DETAILED DESCRIPTION

The present invention provides a technique for analysing performance of an optical fiber link by extracting real-time OTDR trace information from the in-service link, in the presence of Raman amplification.

In order to monitor the performance of an optical link, it would be desirable to obtain the following information separately:

a) The distributed Raman gain profile G(z) which defines the Raman gain as a junction of distance. The distributed Raman gain profile is useful in that it can be monitored over time and Raman-related performance degradation may be detected and localized.

b) A real-time OTDR-like trace obtained "in-service", with Raman amplification ON. Conventional OTDR trace information (i.e. when Raman amplification is OFF) enables the fiber quality to be monitored and defects can be detected and localized. Providing equivalent information for in-service fiber links would enable monitoring of fiber link performance over time, to detect degradation or change not necessarily affecting the Raman gain but the overall performance.

Figure 1A:
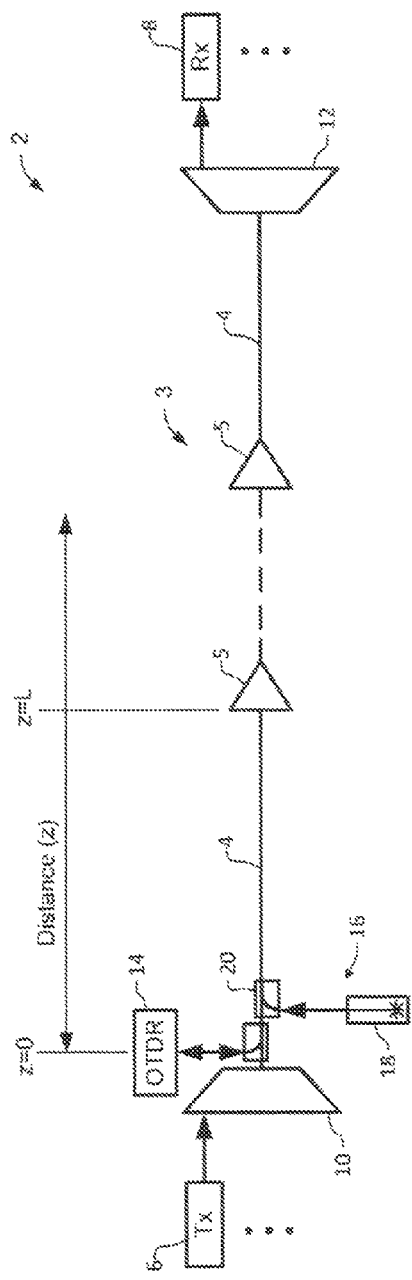
FIGS. 1A-1D are block diagrams schematically illustrating elements of a conventional optical link including OTDR measurement and Raman amplification.
Figure 1B:
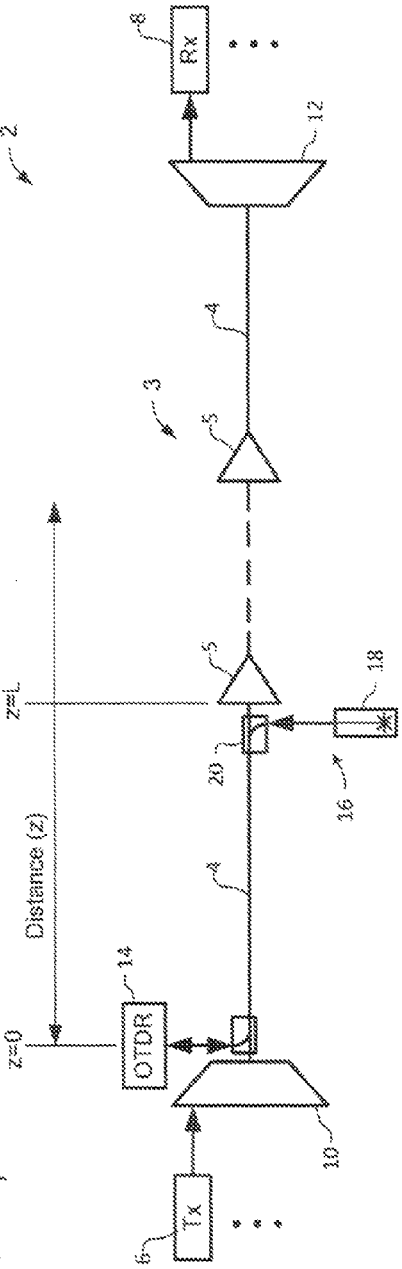
Figure 1C:
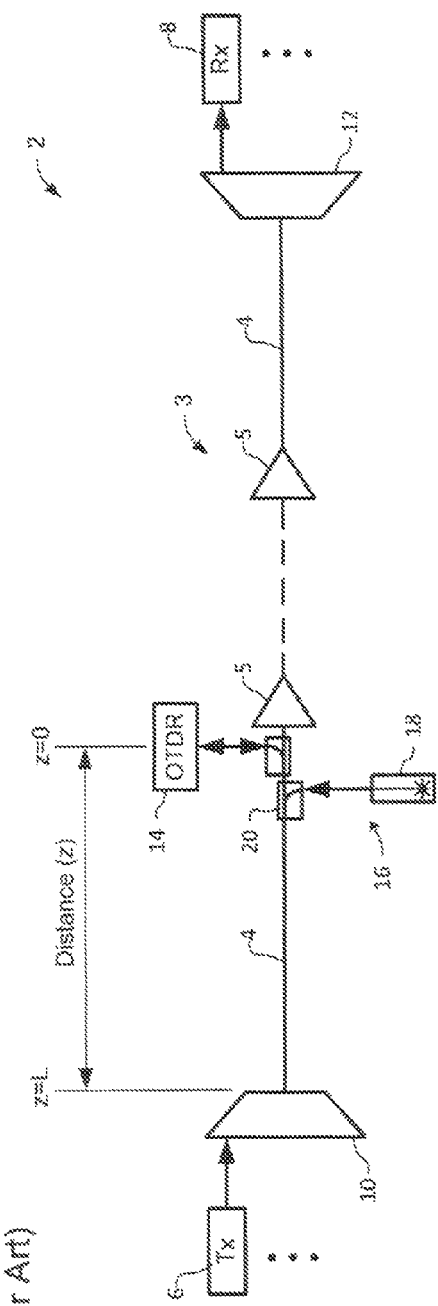
Figure 1D:
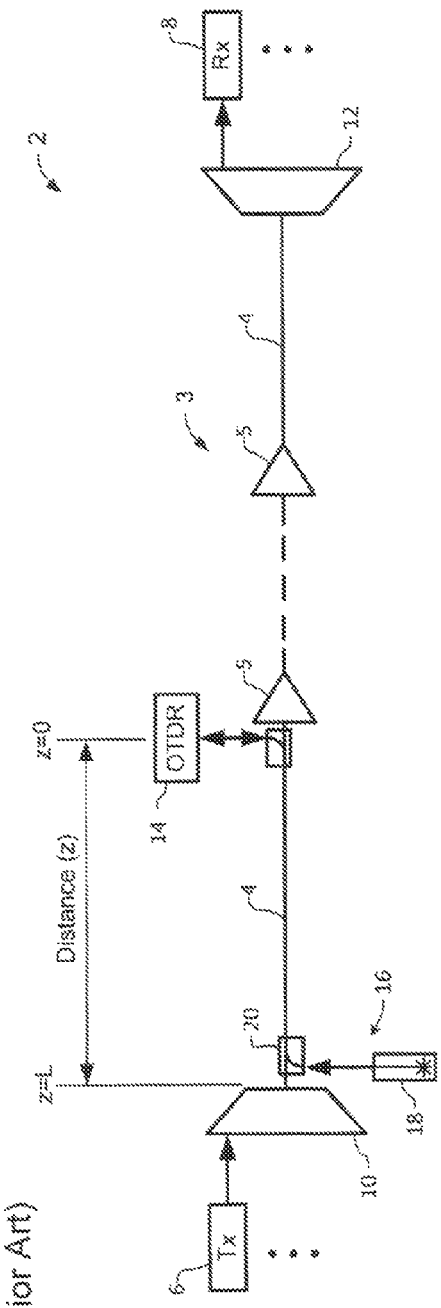

For the purposes of the present description, an embodiment is described in which a counter propagating Raman light arrangement is used (See FIG. 1B), but it will be appreciated that the same techniques can be used to analyse embodiments using co-propagating Raman pump light (FIG. 1A). In fact, it will be appreciated that the present techniques may be used to analyse the optical characteristics of an optical link 3 having any desired combination of co-propagating and counter propagating pump lights launched from any desired number of Raman modules 16, each of which may be located at any suitable location within the link 3. In some embodiments, OTDR sub-systems 14 and Raman modules 16 may be integrated together into a common module, but this is not essential.

Interestingly the real-time OTDR trace information generated using the present techniques is also a function of distance (because the OTDR trace profile is a function of distance). Therefore by understanding the physics behind these measurements we can extract the information lacking in conventional techniques.

In principle the main difference between conventional OTDR trace information and OTDR trace information with Raman amplification ON is due to the contribution of the nonlinear Raman scattering between the Raman pump light and the OTDR pulses. This nonlinear Raman scattering contribution is directly related to the Raman gain. Accordingly, it is possible to estimate the Raman gain profile G(z), by subtracting the OTDR trace with Raman amplification OFF from the OTDR trace with Raman amplification ON. Thus:

$$P(z)^{ON} - P(z)^{OFF} = G(z)[dB] \quad (1)$$

Where $P(z)^{ON}$ and $P(z)^{OFF}$ represent the OTDR power measured when Raman amplification is ON and OFF, respectively. G(z) represents the cumulative Raman gain profile (as a function of distance z). Assuming that Raman amplification is implemented using N pump lasers 18 (which may be provisioned in one or more Raman modules 16), the cumulative gain G(z) can be expressed as:

$$G(z)[dB] = \sum_{n=0}^{N} C_R(n) P_n \frac{1 - e^{-\alpha_n z}}{\alpha_n} \quad (2)$$

Where: $C_R(n)$ is the Raman cross gain between the OTDR wavelength and the $n^{th}$ pump wavelength; $P_n$ is the output power of the $n^{th}$ pump laser; and $\alpha_n$ is the fiber attenuation loss for the $n^{th}$ pump laser wavelength.

The right side of equation (2) can be approximated by one term representing an averaged single pump. With this simplification, equation (2) can be rewritten as:

$$G(z)[dB] \cong C_{R0}(n) P_0 \frac{1 - e^{-\alpha_0 z}}{\alpha_0} \quad (3)$$

Where the subscript "0" identifies an equivalent pump with an average attenuation loss $\alpha_0$, and $C_{R0} P_0 = \sum_{n=1}^{N} C_R(n) P_n$. Note that equation (3) has no approximation for a Raman amplification arrangement based on a single pump laser. Recall that the measurement at z=L (distance from Raman connection) shows the total gain experienced due to the presence of Raman. As illustrated in the flow chart of FIG. 4 (described in greater detail below), this is used in conjunction with the measured telemetry signal gain for narrowing down the troubleshooting if necessary.

Taking the derivative of equation (3), and the natural logarithm of the derivative yields the following:

$$\frac{\partial G}{\partial z} = P_0 C_{R0} e^{-\alpha_0} \quad (4)$$

$$\ln\left(\frac{\partial G}{\partial z}\right) = -\alpha_0 z + cte \quad (5)$$

Where cte $\triangleq \ln(P_0 C_{R0})$ and may be treated as a constant value. Equations (4) and (5) describe the physics in measured gain. Equation (4) defines a distributed incremental Raman gain profile which can be used effectively (as well as equation (2)) to analyse the real time Raman gain (as a function of distance z) within the optical fiber link.

Similarly equation (5) defines the attenuation/loss profile of the fiber link for the averaged pump wavelength. This profile is analogous to an OTDR trace obtained at the averaged pump wavelength, and can be used in a manner closely similar to a conventional OTDR trace.

Figure 2:
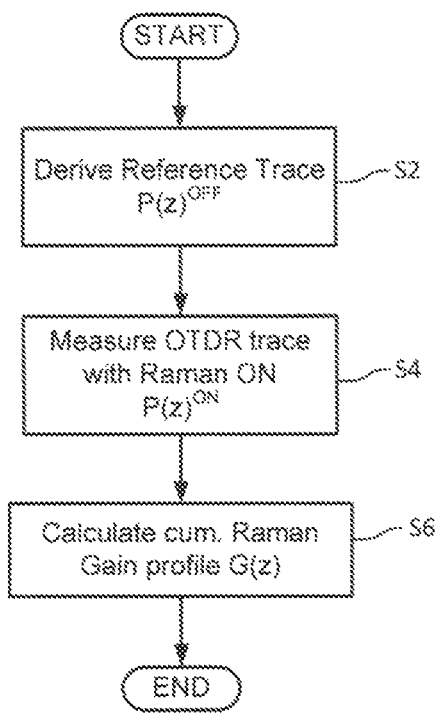
FIG. 2 is a flow chart illustrating principal steps of a process in accordance with a representative embodiment of the present invention.
Figure 3A:
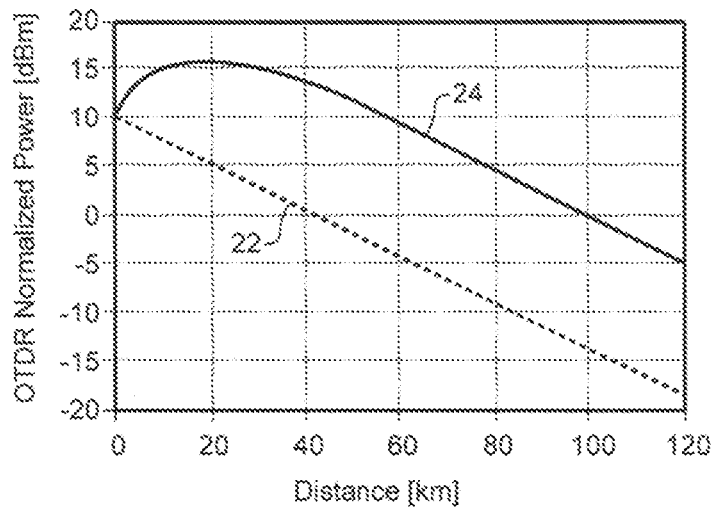
FIGS. 3A-3D are charts illustrating representative gain profiles in the links of FIGS. 1A and 2B.
Figure 3B:
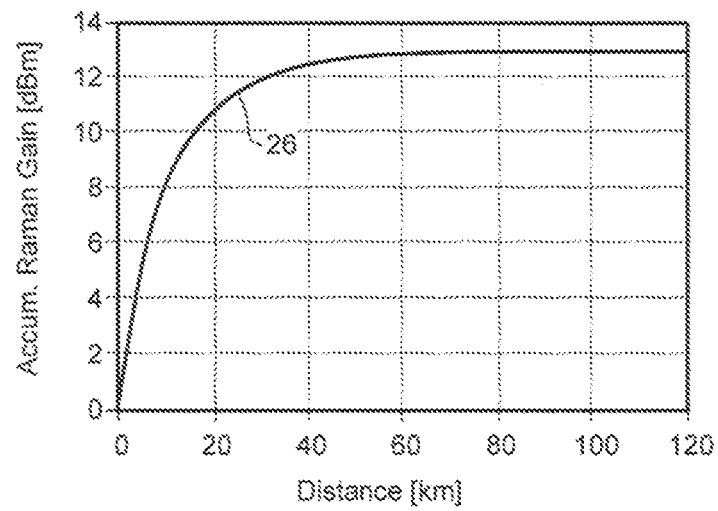
Figure 3C:
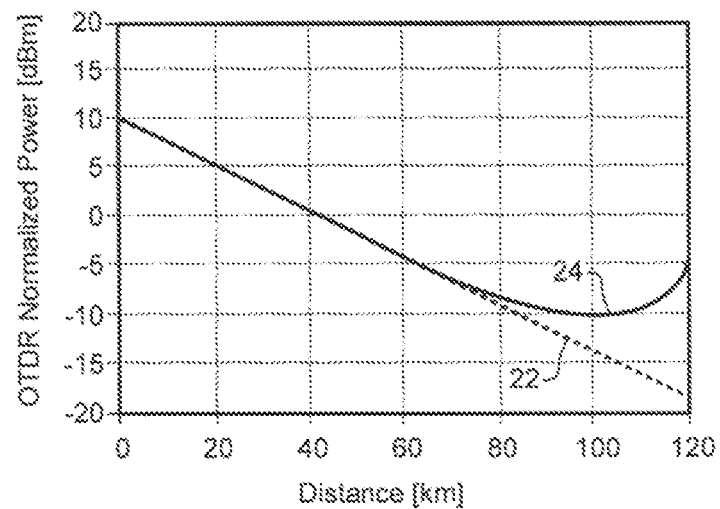
Figure 3D:
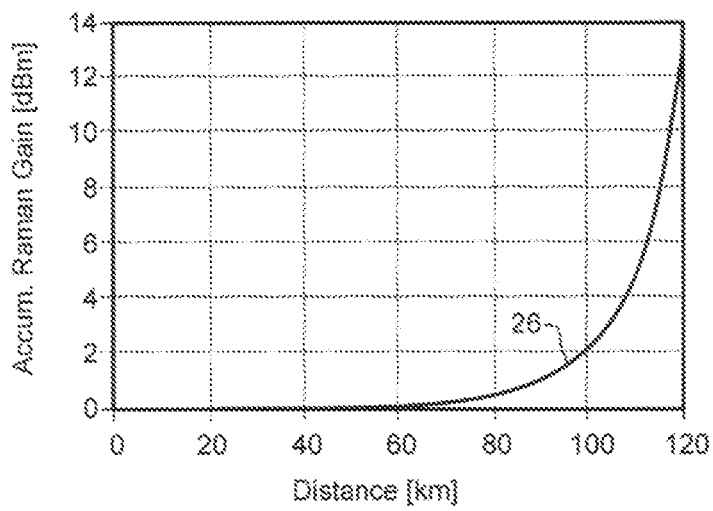

FIG. 2 illustrates a representative method for obtaining a real-time Raman Gain profile an in-service optical link. In some embodiments, this process may be executed by a processor of an integrated module comprising a Raman module 16 and an integrated OTDR sub-system 14 of the type described above. In other embodiments, this algorithm may be implemented by a management system in communication with a Raman module 16 and an OTDR sub-system 14 which may or may not be integrated with the Raman module 16. In some cases, the algorithm may be embodied as machine-readable instruction code stored on a non-transitory machine-readable storage medium for controlling a suitable processor to execute the algorithm. FIGS. 3A-3D illustrate representative trace information obtained using the method of FIG. 2 for an optical fiber span 4 having a length L=120 km. The example of FIGS. 3A and 3B illustrate trace information for a case in which the OTDR pulses and Raman pump lasers are co-propagating with respect to each other. Conversely, the example of FIGS. 3C and 3D illustrate trace information for a case in which the OTDR pulses and Raman pump lasers are counter-propagating with respect to each other.

Referring to FIG. 2, at a first step (step S2), a reference trace is derived, which is indicative of a distributed optical performance of the optical fiber link with no Raman amplification. In some embodiments, the reference trace may be derived by calculating an estimate of the fiber loss using data of the known optical performance of each of the components of the optical fiber link 3. In other embodiments, the reference trace may be derived by performing a conventional OTDR trace measurement with Raman Amplification OFF, to yield the reference OTDR trace 22 shown in FIGS. 3A and 3C. For this reference OTDR trace measurement, the OTDR pulse wavelength may be selected to lie within the Raman gain region. In some embodiments, the OTDR pulse wavelength may also be selected to lie outside the EDFA gain region. In some embodiments, two or more OTDR pulse wavelengths may be used, in which case each OTDR wavelength may be respectively selected to lie inside or outside of the Raman and EDFA gain regions, as desired. In some embodiments, at least one OTDR wavelength may be selected to lie within a spectral region known to be sensitive to fiber faults such as, for example bending, pinching, or water saturation of the cable containing the fiber. Subsequently, an in-service OTDR trace measurement is performed, using the same OTDR pulse wavelength(s) with Raman Amplification ON. This operation yields an in-service OTDR trace 24 (FIGS. 3A and 3C). Using the reference and in-service OTDR traces 22 and 24, the cumulative Raman gain profile 26 (FIGS. 3B and 3D) can be calculated (at S6) following equation 1 above.

As may be appreciated, the process described above will yield a cumulative Raman gain profile at the (or each) OTDR wavelength selected for the OTDR trace measurements. If desired, this process may be executed using an OTDR pulse wavelength corresponding to a wavelength channel of the WDM system, so as to develop a cumulative Raman gain profile 26 pertaining to that wavelength channel. If desired, this process may be repeated for two or more different wavelength channels of the WDM system, so as to develop a family of Raman gain profiles pertaining to some or all of the channels of the WDM system. If desired, this family of Raman gain profiles may be analysed to derive further information regarding the optical characteristics of the optical fiber link. For example, variations in Raman gain as a function of wavelength, as well as estimates of Group delay and dispersion can be readily obtained from the respective Raman gain profiles obtained at different wavelengths.

In some embodiments, the process described above with reference to FIGS. 2 and 3 is performed during initial deployment of an optical link. In this case, the cumulative Raman Gain profile may be used "as-is", or further processed (for example using equation 4) to obtain the incremental Raman gain profile and/or the attenuation/loss profile (for example using equation 5). These results may be used alone, or in combination to validate whether or not the optical link is performing properly before starting to carry traffic. These profiles may also enable point faults to be located within the link, so that, for example, service personnel can investigate and take corrective action.

Figure 4:
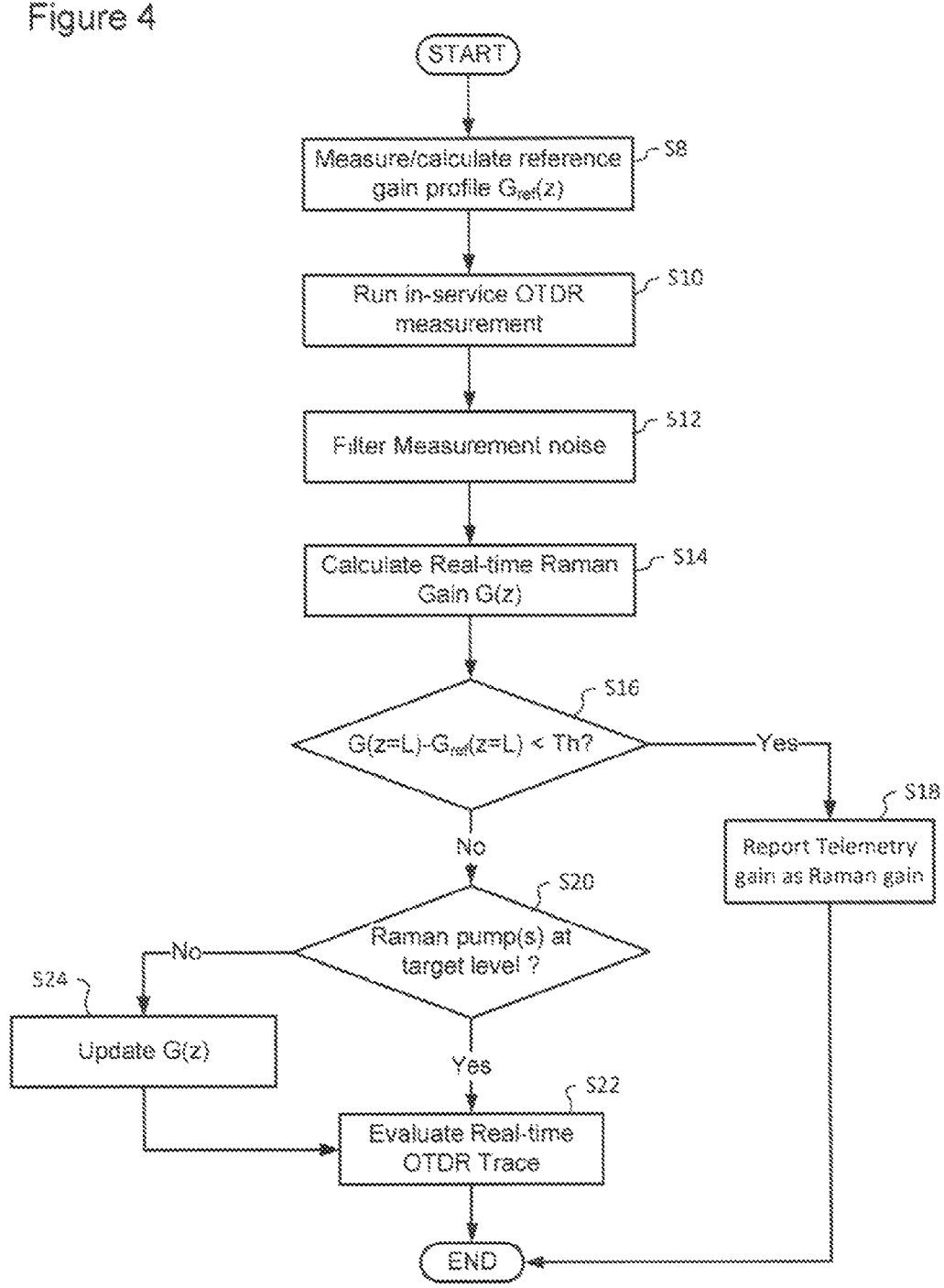
FIG. 4 is a flow chart illustrating principal steps of a process in accordance with a representative embodiment of the present invention.

FIG. 4 illustrates another representative algorithm for extracting real-time OTDR trace information from an in-service optical fiber link. In some embodiments, this algorithm may be executed by a processor of an integrated module comprising a Raman module 16 and an integrated OTDR sub-system 14 of the type described above. In other embodiments, this algorithm may be implemented by a management system in communication with a Raman module 16 and an OTDR sub-system 14 which may or may not be integrated with the Raman module 16. In some cases, the algorithm may be embodied as machine-readable instruction code stored on a non-transitory machine-readable storage medium for controlling a suitable processor to execute the algorithm.

In a preliminary step (S8), the process described above with reference to FIGS. 2 and 3 are performed to generate a reference Raman gain profile $G_{ref}(z)$. In addition, a reference Telemetry Gain can be measured in a conventional manner. The reference Raman gain profile $G_{ref}(z)$, Telemetry Gain profile, and the OTDR trace profile measured with Raman Amplification OFF ($P_{OTDR}^{OFF}$) may then be saved for later use. These operations may be performed prior to the optical link 3 entering service, for example during System Layout and Testing (SLAT) or as part of a failure recovery.

In some embodiments, the OTDR wavelength is selected such that it is in the Raman Gain range, but outside of the gain range for Erbium Doped Fiber Amplification (EDFA). In embodiments in which both Raman and EDFA are used in the link, this selection of OTDR frequency enables in-service monitoring of Raman Gain and Fiber performance without interference from EDFA modules that may also be operating on the link.

Once the optical link has entered service, real-time OTDR data can be obtained by first measuring (at S10) the OTDR power level $P_{OTDR}^{ON}$ as a function of distance (z). Known techniques may then be used (at S12) to process the measured OTDR power level data so as to filter measurement noise. For example, a smoothing or low-pass filtering operation may be performed to reduce scatter in the measured OTDR power level data. The filtered data can then be used, in conjunction with the reference OTDR power level $P_{OTDR}^{OFF}$ and equation 1 to calculate the real-time Raman gain profile $G(z)$ (at S14).

As noted above, the Raman Gain value at z=L (i.e. $G(L)$) shows the total gain experienced due to the presence of Raman amplification. Accordingly, if the difference between the reference and real-time Raman gain values at z=L is less than a predetermined threshold (at S16) then the measured telemetry gain can be treated as a reasonable estimate of the Raman gain (S18). In some embodiments, the threshold value may be provisionable by the user. On the other hand, if the difference between the reference and real-time Raman gain values at z=L is equal to or greater than the threshold value, then the Raman pump laser(s) is(are) checked (at S20) to determine whether or not they are operating at their target output power level. If the Raman pump laser(s) is(are) operating at their target output power level, then the real-time OTDR trace information can be calculated from the real-time Raman gain profile $G(z)$ (at S22) as described in greater detail below. On the other hand, if the Raman pump laser(s) is(are) not operating at their target output power level, then the real-time Raman gain profile $G(z)$ can be re-calculated (at S24) based on the actual Raman pump laser output power, before evaluating the real-time OTDR trace information.

In some embodiments, the reference and/or real-time Raman gain profiles $G_{Ref}(z)$ and $G(z)$ may be used to optimize an optical performance of the optical link 3. For example, consider an embodiment in which Raman modules are provided with multiple pump lasers tuned to different frequencies. In such a case, a family of real-time Raman gain profiles $G(z)$ may be derived, as described above, using a range of different OTDR wavelengths. This information may be used to adjust the respective power level of each Raman pump laser so as to at least partially compensate wavelength dependence of the Raman gain. In a further example, the real-time Raman gain profile $G(z)$ may be used in conjunction with the known location and launch direction of each Raman pump laser to maximize Raman gain in portions of an optical fiber link 3, while at the same time avoiding damage to sensitive optical devices in the link. Other possible uses of the real-time Raman gain profile $G(z)$ will be, or become, apparent to those of ordinary skill in the art, based upon the present description.

Figure 5:
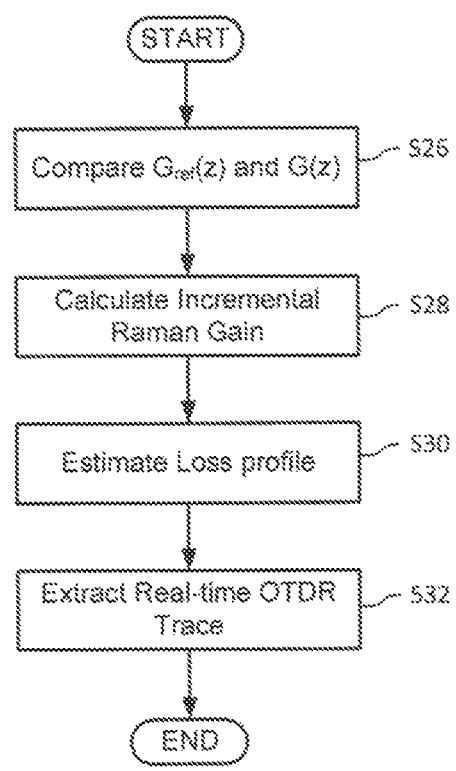
FIG. 5 is a flow chart illustrating principal steps of a process for obtaining real-time OTDR trace information in accordance with a representative embodiment of the present invention It will be noted that throughout the appended drawings, like features are identified by like reference numerals.

FIG. 5 is a flow chart showing principal steps in a process for evaluating the real-time OTDR trace information based on the reference and real-time Raman gain profiles $G_{Ref}(z)$ and $G(z)$, respectively. At a first step (S26), the reference and real-time Raman gain profiles $G_{Ref}(z)$ and $G(z)$, respectively, are compared. This comparison may be used to identify changes in the optical characteristics of the optical link 3 since the reference Raman gain profile $G_{Ref}(z)$ was generated. For example, the appearance of a point loss in the real-time Raman gain profile $G(z)$ that is not present in the reference Raman gain profile $G_{Ref}(z)$ may indicate a problem that requires intervention by a service technician. Then, the incremental Raman gain profile $$\frac{\partial G}{\partial z}$$

is calculated (at S28) by taking the derivative with respect to distance (z) of the real-time Raman gain profile $G(z)$. The loss/attenuation profile of the link can then be estimated (at S30) by taking the natural logarithm of the incremental Raman gain profile $$\frac{\partial G}{\partial z}.$$

As described above, this estimate can be used (at S32) in a manner directly analogous to conventional OTDR trace information, to examine the link performance in the presence of Raman amplification.

The above-described embodiments of the invention are intended to be examples only. Alterations, modifications and variations can be effected to the particular embodiments by those of skill in the art without departing from the scope of the invention, which is defined solely by the claims appended hereto.

We claim:

1. A method of analysing performance of an optical fiber link, the method comprising:
   deriving a reference trace indicative of a distributed optical performance of the optical fiber link;
   during an initial deployment of the optical fiber link, measuring, by an Optical Time Domain Reflectometry (OTDR) sub-system, a first OTDR trace of the optical fiber link with Raman amplification ON; and
   during in-service operation of the optical fiber link, measuring, by the OTDR sub-system, a second OTDR trace with Raman amplification ON; and detecting, by a computer, a change in optical characteristics of the optical fiber link since the first cumulative Raman Grain profile was generated, base on the reference trace, the first OTDR trace and the second OTDR trace.

2. The method as claimed in claim 1, wherein the step of deriving the reference trace comprises either one of:
   calculating an estimate of the distributed optical performance of the optical fiber link based on a known optical performance of components of the optical fiber link; and
   measuring the reference trace by:
      measuring, by the OTDR sub-system, a third OTDR trace with Raman amplification OFF; and
      storing the third OTDR trace as the reference trace.

3. The method as claimed in claim 2, wherein the reference trace and the first OTDR trace are measured using an OTDR pulse wavelength that is selected to lie within a Raman gain range and outside an Erbium Doped Fiber Amplification gain range.

4. The method as claimed in claim 2, wherein the reference trace and the first OTDR trace are measured using an OTDR pulse wavelength that corresponds with a wavelength channel of a Wavelength Division Multiplex (WDM) signal.

5. The method as claimed in claim 1, further comprising:
   calculating, by the computer, a reference cumulative Raman Gain profile based on the reference trace and the first OTDR trace; and
   calculating, by the computer, a real-time cumulative Raman Gain profile based on the reference trace and the second OTDR trace.

6. The method as claimed in claim 5, wherein detecting the change in optical characteristics of the optical fiber link comprises:
   comparing the real-time cumulative Raman Gain profile with the reference cumulative Raman Gain profile; and
   detecting a change in optical characteristics of the optical fiber link since the reference Raman gain profile was generated, based on the comparison result.

7. The method as claimed in claim 5, further comprising controlling at least one Raman pump laser based on the real-time cumulative Raman Gain profile.

8. The method as claimed in claim 5, further comprising:
   calculating a real-time incremental Raman Gain profile based on the calculated real-time cumulative Raman Gain profile; and
   calculating a real-time loss profile of the optical fiber link based on the real-time incremental Raman Gain profile.

9. The method as claimed in claim 8, wherein calculating the real-time incremental Raman Gain profile comprises calculating a derivative with respect to location of the real-time cumulative Raman Gain profile.

10. The method as claimed in claim 8, wherein calculating the loss profile of the optical fiber link comprises calculating a natural logarithm of the real-time incremental Raman Gain profile.

11. A non-transitory machine readable storage medium comprising software instructions for controlling a computer to execute a process for analysing performance of an optical fiber link, the software instructions comprising instructions for controlling the computer to:
   derive a reference trace indicative of a distributed optical performance of the optical fiber link;
   during an initial deployment of the optical fiber link, control an Optical Time Domain Reflectometry (OTDR) sub-system to measure a first OTDR trace with Raman amplification ON; and
   during in-service operation of the optical fiber link, control the OTDR sub-system to measure a second OTDR trace with Raman amplification ON, and detect a change in optical characteristics of the optical fiber link since the first cumulative Raman Gain profile was generated, based on the reference trace, the first OTDR trance and the second OTDR trace.

12. The non-transitory machine readable storage medium as claimed in claim 11, wherein the reference trace is derived by either one of:
   calculating an estimate of the distributed optical performance of the optical fiber link based on a known optical performance of components of the optical fiber link; and
   measuring the reference trace by:
      measuring a third OTDR trace with Raman amplification OFF; and
      storing the third OTDR trace as the reference trace.

13. The non-transitory machine readable storage medium as claimed in claim 12, wherein the reference trace and the first OTDR trace are measured at an OTDR wavelength that is selected to lie within a Raman gain range and outside an Erbium Doped Fiber Amplification gain range.

14. The non-transitory machine readable storage medium as claimed in claim 12 wherein the reference trace and the first OTDR trace are measured using an OTDR pulse wavelength that corresponds with a wavelength channel of a Wavelength Division Multiplex (WDM) signal.

15. The non-transitory machine readable storage medium as claimed in claim 12, further comprising software instructions for controlling the processor to:
   calculate, a reference cumulative Raman Gain based or trace and the first OTDR Trace; and
   calculate a real-time cumulative Raman Gain profile based on the first and second OTDR traces.

16. The non-transitory machine readable storage medium as claimed in claim 15, further comprising software instructions for controlling the computer to:
  calculate a real-time incremental Raman Gain profile based on the real-time cumulative Raman Gain profile; and
  calculate a real-time loss profile of the optical fiber link based on the real-time incremental Raman Gain profile.

17. The non-transitory machine readable storage medium as claimed in claim 15, further comprising software instructions for controlling the processor to:
  compare the real-time cumulative Raman Gain profile with the reference cumulative Raman Gain profile; and
  detect a change in optical characteristics of the optical fiber link since the reference Raman gain profile was generated, based on the comparison result.

18. The non-transitory machine readable storage medium as claimed in claim 15, further comprising software instructions for controlling the processor to control at least one Raman pump laser based on the real-time cumulative Raman Gain profile.

19. A system configured to analyse performance of an optical fiber link, the system comprising:
  an Optical Time Domain Reflectometry (OTDR) sub-system configured to measure OTDR trace information of the optical fiber link; and
  a computer operatively connected for communication with the OTDR subsystem, the computer configured to:
    derive a reference trace indicative of a distributed optical performance of the optical fiber link
    during an initial deployment of the optical fiber link, control the OTDR sub-system to measure a first OTDR trace with Raman amplification ON, and
    during in-service operation of the optical fiber link, control the OTDR sub-system to measure a second OTDR trace with Raman amplification ON, and detect a change in optical characteristics of the optical fiber link since the first cumulative Raman Gain profile was generated, based on the reference trace, the first OTDR trace and the second OTDR trace.

* * * * *